(12) United States Patent
McGonigal et al.

(10) Patent No.: US 8,908,678 B1
(45) Date of Patent: Dec. 9, 2014

(54) INTELLIGENT CALL ROUTING

(71) Applicant: Vonage Network LLC, Holmdel, NJ (US)

(72) Inventors: Graham McGonigal, Roswell, GA (US); Ed Mulligan, Brooklyn, NY (US)

(73) Assignee: Vonage Network LLC, Holmdel, NJ (US)

( * ) Notice: Subject to any disclaimer, the term of this patent is extended or adjusted under 35 U.S.C. 154(b) by 0 days.

(21) Appl. No.: 14/024,118

(22) Filed: Sep. 11, 2013

(51) Int. Cl.
*H04L 12/66* (2006.01)
*H04W 28/02* (2009.01)

(52) U.S. Cl.
CPC .................................. *H04W 28/0268* (2013.01)
USPC .......................................................... 370/352

(58) Field of Classification Search
CPC ......... H04L 45/00; H04L 45/12; H04L 45/02; H04L 45/123; H04L 45/124; H04L 45/22; H04L 29/06027; H04L 29/06326; H04L 29/06; H04L 12/66; H04M 7/006
See application file for complete search history.

(56) References Cited

U.S. PATENT DOCUMENTS

| | | | |
|---|---|---|---|
| 6,542,499 B1 * | 4/2003 | Murphy et al. | 370/352 |
| 2003/0091024 A1 * | 5/2003 | Stumer | 370/352 |
| 2006/0083193 A1 * | 4/2006 | Womack et al. | 370/328 |
| 2009/0268897 A1 * | 10/2009 | Coppage | 379/221.01 |
| 2011/0273979 A1 * | 11/2011 | Grabelsky et al. | 370/225 |
| 2012/0046013 A1 | 2/2012 | Bauman | |
| 2013/0077482 A1 * | 3/2013 | Krishna et al. | 370/230 |
| 2013/0170401 A1 | 7/2013 | Malegaonkar et al. | |

* cited by examiner

*Primary Examiner* — Yong Zhou
(74) *Attorney, Agent, or Firm* — Moser Toboada; Joseph Pagnotta

(57) ABSTRACT

A method and apparatus for routing a telecommunication session request are provided herein. In some embodiments, the method may determining a first set of status attributes of a first device, receiving a request from a second device to establish a telecommunication session with the first device, selecting a route to establish the telecommunication session based on the first set of status attributes of the first device, and establishing the telecommunication session using the selected route.

20 Claims, 4 Drawing Sheets

INTELLIGENT CALL ROUTING

BACKGROUND

1. Field

Embodiments of the present invention relate generally to communication systems and, more particularly, to a method and apparatus for routing calls based upon a device's operating environment and for considering additional criteria, such as recognizing when efficiencies may be realized, when routing communication traffic.

2. Description of the Related Art

Voice over IP (VoIP) is a technological development in the field of telecommunications that is utilized to establish and provide voice communications over a data network using the Internet Protocol (IP). Businesses and individuals implement VoIP by installing the necessary equipment and service (i.e., a "high speed" network or broadband connection) to access a VoIP service provider and activating this telecommunication service. Calls from a VoIP subscriber device to a destination device may be routed via a number of inter-connected networks, such as via the VoIP service provider network, mobile telephone service provider networks, and existing and traditional telecommunications system more commonly referred to as the Public Switched Telephone Network (PSTN) or Plain Old Telephone Service (POTS).

VoIP service providers may provide mobile or desktop VoIP applications (apps) that users can install on their smartphone or other type of mobile or stationary computing devices, or may provide VoIP Telephone/Terminal Adaptors (TA) that can be used with traditional hardwire telephones. These VoIP enabled devices are referred to herein as VoIP devices. At least a portion of the call may be transmitted as packets over an IP network, via WIFI for example, rather than over traditional mobile phone mobile communication technology standards (e.g., 2G, 3G, and the like). By transmitting voice as packet data over an IP network, these mobile apps can allow a user to make free or low-cost calls to domestic and international destinations. They may be used when the user is connected to a base station over the mobile operator's cell network, over a third-party's WiFi access point, over WIMAX, and the like.

When one VoIP device user makes a call directed to another VoIP device user over an IP network, it may be referred to as an "on-net" or data based session call. In this case, the call is made entirely over an IP network using WIFI for example. Thus, the VoIP provider does not typically pay termination costs normally associated with connecting a call to a recipient. It should be noted that while an "on-net" call may be nominally directed to a phone number associated with the recipient VoIP device, the actual destination is the IP address associated the recipient's VoIP device. Other times, a VoIP device user may make a call directed to a number other than that of another VoIP device user, or to the VoIP device user using traditional mobile phone mobile communication technology standards, or PSTN standards (i.e., a voice based session or "off-net" call). In this case, the outgoing leg of the call is still transmitted as voice packet data over an IP network. However, the incoming leg of the call is established using traditional mobile phone mobile communication technology standards. In the latter case, the VoIP service provider must pay a termination cost. This cost is either passed down to the subscriber (generally, the originating caller) or is absorbed by the VoIP service provider.

A situation may arise where the originating caller makes an "off-net" call to a recipient device, yet the recipient device could have equally received the same call as "on-net", for example, over a VoIP app installed on the recipient device using a WIFI or WIMAX wireless data network connection. In that situation, the VoIP provider will pay termination costs on a call where terminating in an "off-net" manner may not have been necessary. Conversely, situations may arise where an "on-net" call may be sub-optimal, such as when the conditions of the WIFI or WIMAX wireless data network connections are not suited for voice communications. What is needed is a way to recognize when efficiencies may be realized by turning an "off-net" call into an "on-net" call, and vice versa.

Accordingly, there exists a need in the art for a method and apparatus for considering additional criteria, such as recognizing when efficiencies may be realized, when routing communication traffic.

SUMMARY

A method and apparatus for routing a telecommunication session request are provided herein. In some embodiments, the method may include determining a first set of status attributes of a first device, receiving a request from a second device to establish a telecommunication session with the first device, selecting a route to establish the telecommunication session based on the first set of status attributes of the first device, and establishing the telecommunication session using the selected route.

In some embodiments, a method for rerouting an established telecommunication session between a first device and a second device communicating over a first network type may include determining a set of status attributes of at least one of the first device, selecting a second network type to transfer the established telecommunication session to based on the set of status attributes of the first device, and transferring the telecommunication session to the second network type.

In some embodiments, an apparatus for routing a telecommunication session request on a internal telecommunication network includes at least one processor, at least one input device, and at least one storage device storing processor executable instructions which, when executed by the at least one processor, performs a method including determining a first set of status attributes of a first device, receiving a request from a second device to establish a telecommunication session with the first device, selecting a route to establish the telecommunication session based on the first set of status attributes of the first device, and establishing the telecommunication session using the selected route.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
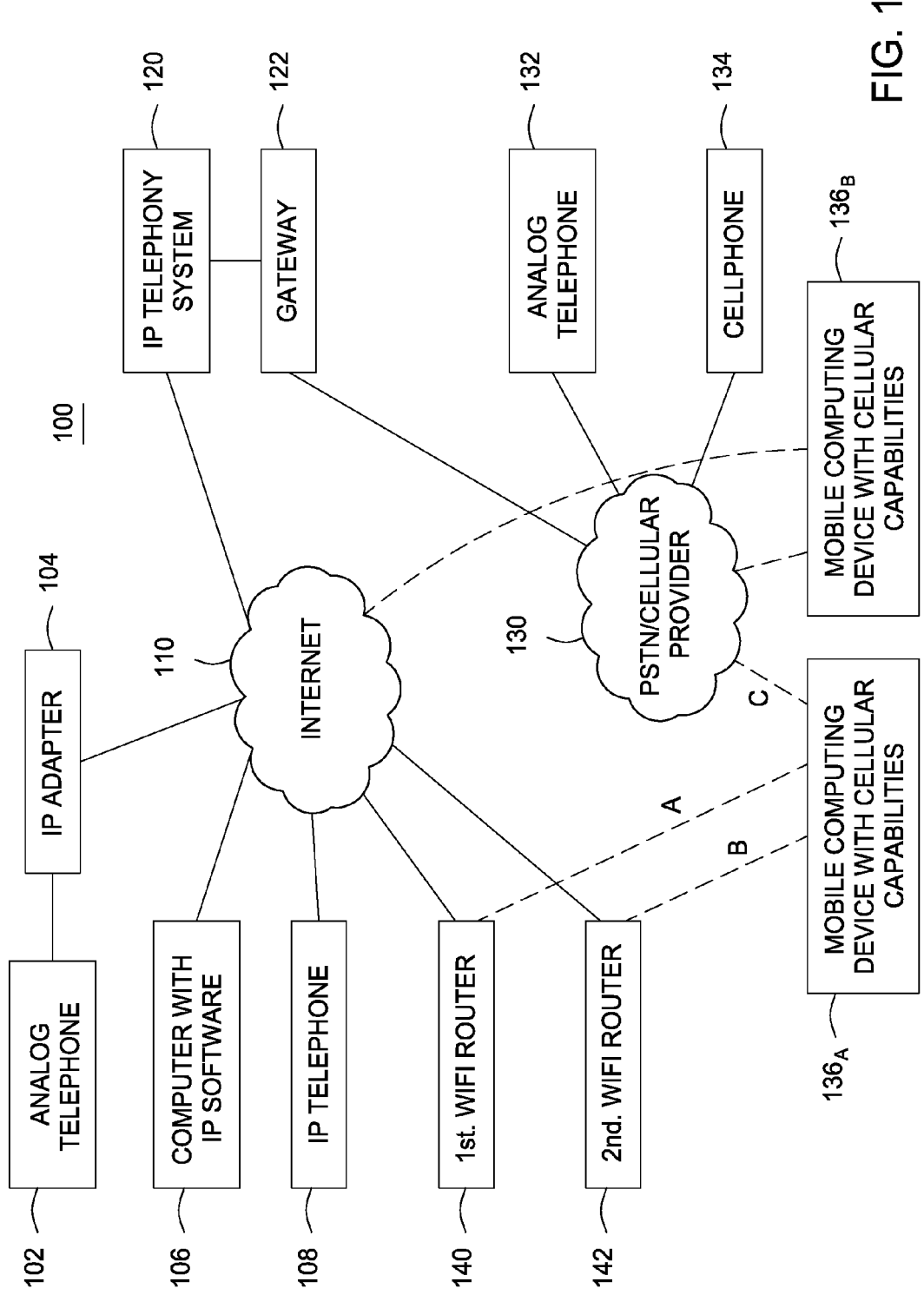
FIG. 1 depicts a block diagram of a telecommunication network, according to one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention relate generally to communication systems and, more particularly, to a method and apparatus for routing calls based upon a device's operating environment. Specifically, embodiments of the present invention recognize when efficiencies may be realized by turning an "off-net" call (e.g., a voice based session call) into an "on-net" call (e.g., a data based session call), and vice versa.

As used herein, communication sessions described as data based sessions include packet-switched means of transport, whereas voice based sessions include circuit-switched means of transport. More specifically, data based sessions may be established over network types that include, but not limited to, WIFI, WIMAX, Evolved High Speed Packet Access (HSPA+), General packet radio service (GPRS), Evolution-Data Optimized (EVDO), Long-term Evolution (LTE), 4G, and the like. Meanwhile, voice based sessions may be established over network types that include POTS/PSTN, voice connections over cell networks (e.g., such as, but not limited to, CDMA 1x, WCDMA, 2G, 3G, etc.), and the like.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "selecting", "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. The following detailed description of preferred embodiments refers to the accompanying drawings, which illustrate specific embodiments of the invention. Other embodiments having different structures and operations do not depart from the scope of the present invention.

In the following description, the terms VoIP system, VoIP telephony system, IP system and IP telephony system are all intended to refer to a system that connects callers and that delivers data, text and video communications using Internet protocol data communications.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities $136_A$ (e.g., a smartphone) is capable of establishing a first wireless data connection A with a first wireless access point 140, such as a WiFi or WiMax router. The first wireless access point 140 is coupled to the Internet 110. Thus, the mobile computing device $136_A$ can establish a VoIP telephone call with the IP telephony system 120 via a path through the Internet 110 and the first wireless access point 140.

FIG. 1 also illustrates that the mobile computing device $136_A$ can establish a second wireless data connection B with a second wireless access point 142 that is also coupled to the Internet 110. Further, the mobile computing device $136_A$ can establish either a third wireless data connection C via a packet-switch network provided by a cellular service provider 130 using its cellular telephone capabilities, or establish a voice based session telephone call via a circuit-switched network provided by a cellular service provider 130. The mobile computing device $136_A$ could also establish a VoIP telephone call with the IP telephony system 120 via the second wireless connection B or the third wireless connection C.

Although not illustrated in FIG. 1, the mobile computing device $136_A$ may be capable of establishing a wireless data connection to a data network, such as the Internet 110, via alternate means. For example, the mobile computing device $136_A$ might link to some other type of wireless interface using an alternate communication protocol, such as the WIMAX standard.

Similarly, mobile computing device with cellular capabilities $136_B$ may also be coupled to internet 110 and/or cellular service provider 130. In some embodiments, mobile computing device $136_B$ may be connected to internet 110 via a WIFI or WIMAX connection, and the like, and can also establish a VoIP telephone calls with the IP telephony system 120 similar to mobile computing device $136_A$. In embodiments of the present invention, communications environment 100 may be used to establish voice based or data based telecommunications sessions between mobile computing device $136_A$ and mobile computing device $136_B$, depending on various criteria associated with each of the mobile computing devices, as will be described below in more detail.

Figure 2:
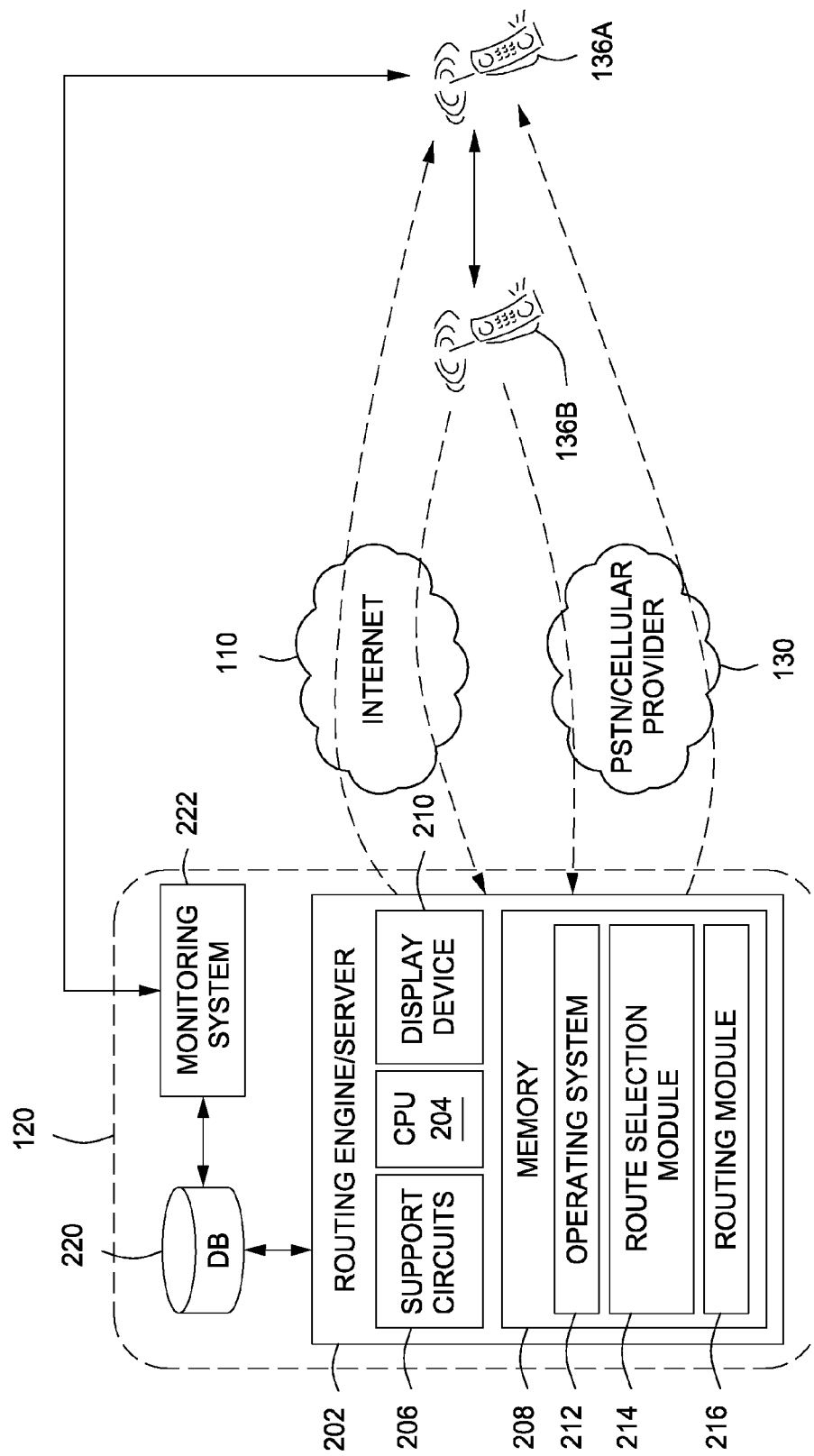
FIG. 2 is a diagram of a routing engine and associated elements, according to one or more embodiments of the invention.

As shown in FIG. 2, in some embodiments IP telephony system 120 may include a routing engine 202, a routing information database 220, and a network monitoring system 222. The routing engine 202 determines/selects the network routes for establishing a telecommunication connection between end user devices (e.g., mobile computing device $136_A$ and mobile computing device $136_B$), and routes the telecommunication traffic accordingly. The routing engine 202 comprises a Central Processing Unit (CPU) 204, support circuits 206, memory 208, and, in some embodiments, a display device 210. The CPU 204 may comprise one or more commercially available microprocessors or microcontrollers that facilitate data processing and storage. The various support circuits 206 facilitate the operation of the CPU 204 and include one or more clock circuits, power supplies, cache, input/output circuits, and the like. The memory 208 comprises at least one of Read Only Memory (ROM), Random Access Memory (RAM), disk drive storage, optical storage, removable storage and/or the like. In some embodiments, the memory 208 comprises an operating system 212, route selection module 214, and a routing module 216.

The operating system (OS) 212 generally manages various computer resources (e.g., network resources, file processors, and/or the like). The operating system 212 is configured to execute operations on one or more hardware and/or software modules, such as Network Interface Cards (NICs), hard disks, virtualization layers, firewalls and/or the like. Examples of the operating system 212 may include, but are not limited to, LINUX, MAC OSX, BSD, UNIX, MICROSOFT WINDOWS, IOS, ANDROID and the like.

The routing selection module 214 determines the network routes for establishing a telecommunication connection between end user devices (e.g., mobile computing device $136_A$ and mobile computing device $136_B$) and selects the most efficient route. Specifically, routing selection module 214 may use information stored in routing information database 220 to determine how to route calls/data. After a route has been determined by routing selection module 214, the routing module 216 uses the determined route to route the call/data accordingly. Although described herein as a routing engine 202 including routing selection module 214 and routing module 216, in some embodiments, these modules may be included on one or more separate devices that communicate with each other. In addition, although shown as separate elements, routing database 220 and monitoring system to 222 may be part of the routing engine 202. In other embodiments, routing database 220 and/or monitoring system 222 may be external systems maintained by a third-party entity and accessed by IP telephony system 120. In some embodiments, the routing information database 220 may be part of the registration database or other existing database maintained by the VoIP provider.

The routing information database 220 includes information used to determine telecommunication session routing. For example, routing information database 220 may include various status attributes for each of the telephony devices shown in FIG. 1, such as, for example, mobile computing device $136_A$ and mobile computing device $136_B$. Status attributes for the telephony devices describe the state of the devices, including, for example, the devices' past or current operating environment conditions. For example, with respect to mobile computing devices $136_A$ and $136_B$, in some embodiments, status attributes may include information such as whether a mobile VoIP app is installed on mobile computing device being called, whether the mobile app is active, the wireless communication connections available (e.g., 2G, 3G, 4G, LTE, WIFI, WIMAX, and the like), the service providers for the communication connections available, the status and Quality of Service (QoS) of the data and/or voice communication connections available, the geographic location of the device, the battery level of the device, the data transfer limits associated with a user's account, and the like.

Some exemplary QoS information that may be determined and/or monitored by monitoring system 222 may include, but are not limited to, call completion statistics and call quality statistics. Some examples of call quality statistics may include, but are not limited to, signal strength, packet loss, signal jitter, signal propagation delay, dropped calls, and utilization. The quality of data connections may be measured in various ways. In some embodiments, quality testing of a data connection may be triggered when a connection to a new access point is detected or at some predefined time interval. Examples of the type of quality testing that may be performed may include: checking the signal strength of the wireless connection; sending test packets to and from the telephony devices based on predetermined testing protocols (e.g., a test packet transmission benchmark); and initiating a background test call that is unnoticeable by the user based on a predetermined testing protocol such as a known voice profile (e.g., a voice profile benchmark). The frequency of call data testing or sampling may be based on a change in the quality and/or location of the data over time. A change in quality or location may indicate a higher likelihood of changing conditions and a need to more frequently assess the connection to make routing decisions. In some embodiments, if conditions are relatively stable, sampling frequency may be reduced. For example, if mobile device 136a is relatively stable with regards to its location (e.g. at home or office with a reliable WIFI connection, the network connections available to the mobile device 136a, and attributes of those network connections available, may not change rapidly. Therefore, the system may sample less frequently (i.e., obtain status attributes less frequently) when the device is not moving. Alternately, if mobile device 136a is located in a moving vehicle, the network connections available to the mobile device 136a, and attributes of those network connections available, may change rapidly. Therefore, the system may sample more frequently (i.e., obtain status attributes more frequently) in a moving vehicle.

In other embodiments, QoS information may be pulled from sources other than the telephony devices themselves, such as from other devices connected to the same Wi-Fi access point (e.g., a laptop computer, a tablet, etc.), from the access point provider itself, or from a third-party maintaining information about various access points. Other types of QoS status attributes may include geographic reachability maps, which provides information regarding the availability of various service providers and QoS data criteria associated with the service provider.

In some embodiments, QoS status attributes may be stored in routing database 220 based on observed patterns, such as for example, based on time of day or week. By monitoring, determining and storing data based on these observed patterns, intelligent routing decisions may be made to avoid peak data transfer periods that may affect call quality. In some embodiments, the status attribute information stored in routing database 220 may be used to make real time predictive decisions of the quality of data for a for a call request to establish a telecommunication session. For example, when a new call request is received, the quality of data may be predicted based on the recipient's location and available carriers.

The status attribute information stored in database 220 may be obtained from and/or determined by monitoring system 222. In some embodiments, the monitoring system 222 pulls information from some or all telephony devices shown in FIG. 1. In addition, the monitoring system 222 can auto-discover telephony devices, extract operating environment status attributes, and collect/report the state of the telephony devices. The monitoring system 222 may provide an interface for receiving the status attributes directly from the telephony devices, for example, via the VoIP apps installed on the devices. Some of the status attributes may be readily collected directly from the VoIP device itself. For example, if the VoIP device is a mobile phone, some of the status attributes collected may include whether a VoIP app is installed on the device and whether the app is active. Other information may be available through application programming interface (API) calls to the devices operating system. In other embodiments, this information may be obtained from the telephony devices by other means and automatically or manually loaded into routing information database 220.

Figure 3:
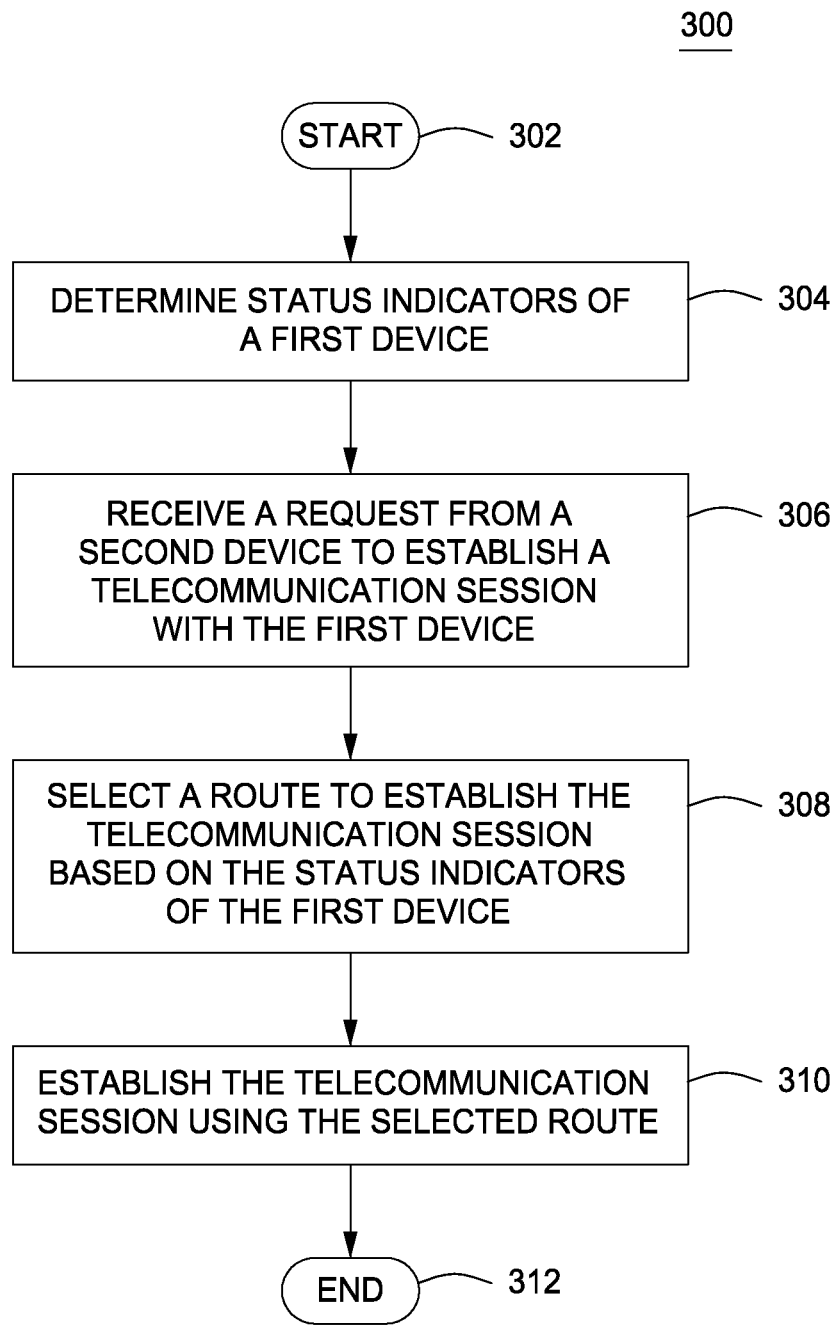
FIG. 3 depicts a flow diagram of a method for routing calls based upon internal network conditions, according to one or more embodiments of the invention.

A method 300 in accordance with the subject invention is illustrated in FIG. 3 which depicts a flowchart having a series of steps for determining a telecommunication network route for establishing a telecommunication session. In some embodiments, the method 300 may be entirely performed by the routing engine 202. In other embodiments, the method 300 may be entirely performed by a mobile device (e.g., mobile device $136_A$). Still in other embodiments, portions of the method 300 may be performed by the routing engine 202, while other portions are performed by a mobile device.

In detail, the method 300 starts at 302 and proceeds to 304 where a first set of status attributes of a first device are determined. The first set of status attributes may include one or more of the status attributes described above. For example, as shown in FIG. 2, status attributes of mobile computing device $136_A$ may be monitored, collected, and/or otherwise determined by monitoring system 222. In some embodiments, status attributes may be received by the monitoring system 222 as signals from a VoIP app installed on mobile computing device $136_A$. The status attributes may be sent via Session Initiation Protocol (SIP) REGISTER or SIP KEEP-ALIVE messages. In some embodiments, the status attributes may be provided to the VoIP provider in proprietary headers included in existing signaling mechanisms, such as SIP registration packets of stay-alive messages. SIP is a popular communication protocol for initiating, managing and terminating media (e.g., voice, data and video) sessions across packet based networks that typically use the Internet Protocol (IP) of which VoIP is an example. The details and functionality of SIP can be found in the Internet Engineering Task Force (IETF) Request for Comments (RFC) Paper No. 3261 entitled, "SIP: Session Initiation Protocol" herein incorporated in its entirety by reference. SIP establishes and negotiates a session, including the modification or termination of a session. It uses a location-independent address system feature in which called parties can be reached based on a party's name. SIP supports name mapping and redirection allowing users to initiate and receive communication from any location. Other signaling protocols may also be used to send the status attributes. Alternatively, some of the signaling may be passed directly between two telephony devices (such as between mobile computing device $136_A$ and mobile computing device $136_B$) when properly-provisioned, such as with the same VoIP app. The determined status attributes may be stored in routing database 220. In some embodiments, the monitoring or determination of various status attributes may be triggered after a request to establish communication session is received.

At 306, a request from a second device to establish a telecommunication session with the first device is received. In some embodiments, as shown in FIG. 2 for example, the request may be received by the routing engine 202 from mobile computing device $136_B$ attempting to establish a telecommunication connection with mobile computing device $136_A$. In some embodiments, the request from mobile computing device $136_8$ may be received as an off-net voice based session call to mobile computing device $136_A$. In other embodiments, the request may be received as an on-net data based session call using a VoIP app installed on mobile computing device $136_B$.

At 308, the routing engine 202 may select a route to establish the telecommunication session based on the at least one status attribute of the first device. That is, based on the determined status of the first device, intelligent routing decisions may be made. For example, in some embodiments, after receiving the telecommunication session request from mobile computing device $136_B$, routing engine 202 may determine whether to route the telecommunication session as a voice based session over circuit switched networks (e.g., using PSTN, 2G, 3G, etc.) or as a data based session over a packet-switch network (e.g., via WIFI, WIMAX, and the like).

Various non-limiting examples of determination logic that may be used, individually or in combination, are described below. For example, if the WIFI connection quality is good, the routing engine 202 may force the completion of the incoming call as a data based telecommunication session over a packet-switch network) instead of routing over a circuit switched networks. If the WIFI signal and/or data transfer quality is poor or otherwise inadequate, the routing engine 202 may establish/route the telecommunication session as a voice based telecommunication session over a circuit switched network.

In another example, if the routing engine 202 determines that any of the data connections available to the first device are stable enough for a voice call based on historical sampling of quality and/or location data, than routing engine 202 may determine to establish/route the call as a data based telecommunication session over a packet-switch network. However, if all the packet-switch networks are considered unstable (for example, if a mobile device is in a moving vehicle where WIFI is not practical, or if in a crowded airport where WIFI access may have a lot of variation in capacity and signal strength), then routing engine 202 may select to route the call over a circuit-switched network.

Additional examples may include: determining whether a mobile computing device is in "home" area based on location data or by querying the user's carrier, and decide which type of termination is most economical (i.e., the lowest cost communication connection); and taking into account the relative battery consumption of each potential termination method, including in connection with the current battery life of the device. For example, when the battery level is below a minimum threshold level, the telecommunication session may prioritize a WIFI connection of a 2G connection over a 4G connection in order to conserve battery life and make sure the call goes through.

As described above, the determination of the most efficient termination behavior may be performed by the routing engine 202. In some embodiments, the determination of the proper termination behavior may occur on any of the devices participating on a call, or it may be distributed across the devices participating on call. For example, in response to the sender's request to initiate a call, the recipient device may respond with data regarding its available communication network connections and quality associated with each; in response, the sender device may forgo the "on-net" call and attempt to terminate "off-net" instead. In other embodiments, the recipient device may process its own quality of data information locally, and instruct the sender device that conditions are inadequate for an "on-net" call, and to initiate an "off-net" call instead. In alternative embodiments, a recipient device could force the telecommunication connection to a given network type (e.g., "Answer over WIFI").

In some embodiments, determining a route may include determining a set of routes, and then selecting the most efficient route from the determined set of routes based on various status attributes. The set of routes may be filtered and/or ranked based on quality, cost, and the like. In some embodiments, a profile associated with the end-user device may provide a weight or ranking of various types of status attributes to consider and/or assign a higher/lower priority to various types of status attributes. The profile may be a default profile set by the device manufacturer or the telecommunication service provider, and may be modified by the end-user as desired. The set of routes determined may be prioritized based on the device profile. In some embodiments, a user may manually select a desired route or a route may be automatically selected.

After the route is determined, the telecommunication session is established at 310 using the determined route. At that point, the devices that are party to the call may begin to communicate with each other.

In some embodiments, after the telecommunication session is established, a second set of status attributes may be determined or received. The second set of status attributes may indicate that another network type is available that may provide better quality, lower cost, etc. An alternate route to transfer the established telecommunication session to may be selected based on the second set of status attributes of the first device, and the telecommunication session may be seamlessly transferred to the selected alternate route. For example, if an established telecommunication session is using WIFI and an IP network for a VoIP call, the second set of status attributes may indicate that the WIFI connection is becoming unstable/weak and a better quality connection exists over a 4G network. A seamless transfer of the telecommunication session may be made from the WIFI network to the 4G network. In some embodiments, the seamless transfer of the telecommunication session may be implemented in accordance with standards/protocols defined by the 3rd Generation Partnership Project (3GPP).

The method 300 ends at 312.

The embodiments of the present invention may be embodied as methods, apparatus, electronic devices, and/or computer program products. Accordingly, the embodiments of the present invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 4:
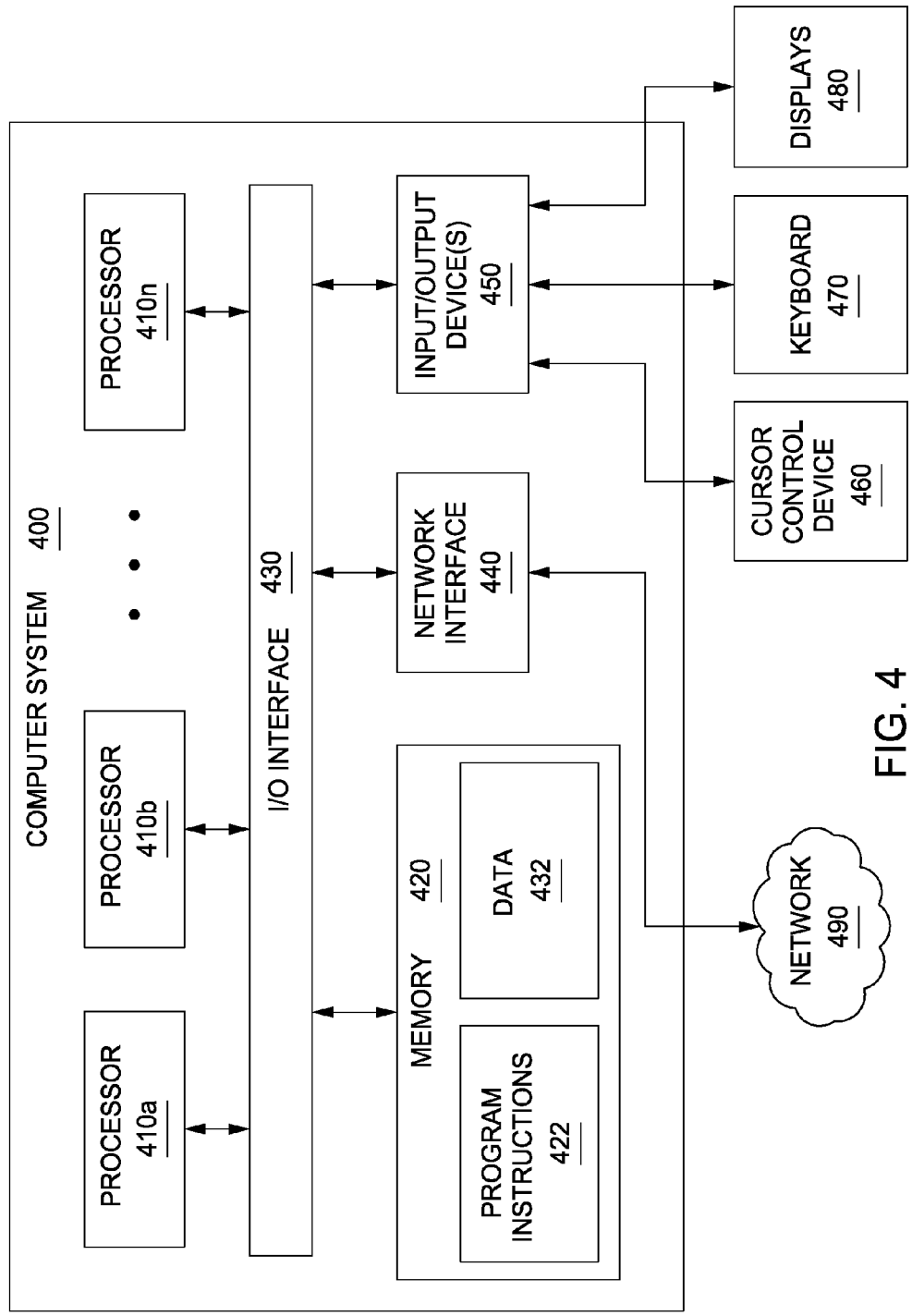
FIG. 4 is a detailed block diagram of a computer system, according to one or more embodiments.

FIG. 4 depicts a computer system 400 that can be utilized in various embodiments of the present invention to implement the computer and/or the display, according to one or more embodiments.

Various embodiments of method and apparatus for routing calls based upon internal network conditions and/or external carrier network information, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement method 200 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), non-volatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 440 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowchart of FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for routing a telecommunication session request comprising:
    determining a first set of status attributes of a first device, wherein the first set of status attributes includes information indicating whether a mobile Voice over Internet Protocol (VoIP) app is installed on the first device;

receiving a request from a second device to establish a telecommunication session with the first device, wherein the first device and the second device are telecommunication endpoints;

selecting a route to establish the telecommunication session based on the first set of status attributes of the first device;

establishing the telecommunication session using the selected route;

determining a second set of status attributes of the first device;

selecting an alternate route to transfer the established telecommunication session to based on the second set of status attributes of the first device; and transferring the telecommunication session to the selected alternate route.

2. The method of claim 1, wherein the request originates over a first network type, and wherein the selected route is over a second network type different from the first network type.

3. The method of claim 2, wherein the alternate route selected is over a third network type different from the second network type.

4. The method of claim 2, wherein the first network type is one of a packet-switched network or a circuit-switched network, and wherein the second network type is one of a packet-switched network or a circuit-switched network.

5. The method of claim 2, wherein the first network type is one of 2G, 3G, 4G, GPRS, EVDO, LTE, HSPA+, WIFI or WIMAX, and wherein the second network type is one of 2G, 3G, 4G, GPRS, EVDO, LTE, HSPA+, WIFI or WIMAX.

6. The method of claim 1, wherein the first set of status attributes includes at least one of mobile VoIP app information, communication connection availability information, service providers information for communication connections available, Quality of Service (QoS) information for communication connections available, geolocation information of the first device, cost for using communication connections available, an indication that the mobile VoIP app is active, or battery level of the first device.

7. The method of claim 6, wherein the QoS information for communication connections available includes at least one of signal strength, packet loss, signal jitter, signal propagation delay, dropped calls, and utilization of at least one of the communication connections available.

8. The method of claim 1, wherein the first set of status attributes includes a cost for using communication connections available to the first device, and wherein the selected route is a network type that provides a lowest cost communication connection for establishing the telecommunication session.

9. The method of claim 1, wherein the first set of status attributes indicates that a WIFI data connection available to the first device satisfies a quality of service criteria, and wherein the selected route is the WIFI data connection.

10. The method of claim 1, wherein the first set of status attributes indicates that a WIFI data connection available to the first device does not meet a quality of service criteria, and wherein the selected route is over a network type different than the WIFI data connection.

11. The method of claim 1, wherein a routing engine selects the route to establish the telecommunication session based on the first set of status attributes.

12. The method of claim 1, wherein the first device selects the route to establish the telecommunication session based on the first set of status attributes.

13. A method for rerouting an established telecommunication session between a first device and a second device communicating over a first network type, wherein the first device and the second device are telecommunication endpoints, the method comprising:

determining a set of status attributes of the first device, wherein the first set of status attributes includes information indicating whether a mobile Voice over Internet Protocol (VoIP) app is installed on the first device;

selecting a second network type to transfer the established telecommunication session to based on the set of status attributes of the first device; and transferring the telecommunication session to the second network type.

14. The method of claim 13, wherein the set of status attributes includes at least one of mobile VoIP app information, communication connection availability information, service providers information for communication connections available, Quality of Service (QoS) information for communication connections available, geolocation information of the first device, cost for using communication connections available, an indication that the mobile VoIP app is active, or battery level of the first device.

15. The method of claim 14, wherein the QoS information for communication connections available includes at least one of signal strength, packet loss, signal jitter, signal propagation delay, dropped calls, and utilization of at least one of the communication connections available.

16. The method of claim 13, wherein the first network type is one of a packet-switched network or a circuit-switched network, and wherein the second network type is one of a packet-switched network or a circuit-switched network.

17. An apparatus for routing a telecommunication session request comprising:

a) at least one processor;

b) at least one input device; and c) at least one storage device storing processor-executable instructions which, when executed by the at least one processor, performs a method including 1) determining a first set of status attributes of a first device wherein the first set of status attributes includes information indicating whether a mobile Voice over Internet Protocol (VoIP) app is installed on the first device;

2) receiving a request from a second device to establish a telecommunication session with the first device, wherein the first device and the second device are telecommunication endpoints;

3) selecting a route to establish the telecommunication session based on the at least one status attribute of the first device; and 4) establishing the telecommunication session using the selected route;

5) determining a second set of status attributes of the first device;

6) selecting an alternate route to transfer the established telecommunication session to based on the second set of status attributes of the first device; and 7) transferring the telecommunication session to the selected alternate route.

18. The apparatus of claim 17, wherein the request originates over a first network type, and wherein the selected route is over a second network type different from the first network type.

19. The apparatus of claim 18, wherein the first network type is one of a packet-switched network or a circuit-switched network, and wherein the second network type is one of a packet-switched network or a circuit-switched network.

20. The apparatus of claim 17, wherein the first set of status attributes includes at least one of mobile VoIP app information, communication connection availability information, service providers information for communication connections available, Quality of Service (QoS) information for communication connections available, geolocation information of the first device, cost for using communication connections available, an indication that the mobile VoIP app is active, or battery level of the first device.

* * * * *

UNITED STATES PATENT AND TRADEMARK OFFICE
CERTIFICATE OF CORRECTION

| | | |
|---|---|---|
| PATENT NO. | : 8,908,678 B1 | |
| APPLICATION NO. | : 14/024118 | |
| DATED | : December 9, 2014 | |
| INVENTOR(S) | : McGonigal et al. | |

It is certified that error appears in the above-identified patent and that said Letters Patent is hereby corrected as shown below:

In the Claims

In column 16, line 7, Claim 13, delete the term "first" from the recited "first set of status attributes"

Signed and Sealed this
Twenty-third Day of June, 2015

Michelle K. Lee
*Director of the United States Patent and Trademark Office*